March 2, 1971    F. SPEER    3,567,314
CARTRIDGE-TYPE SPRING-LOADED HINGE FOR SPECTACLE FRAMES
Filed June 2, 1969    3 Sheets-Sheet 1
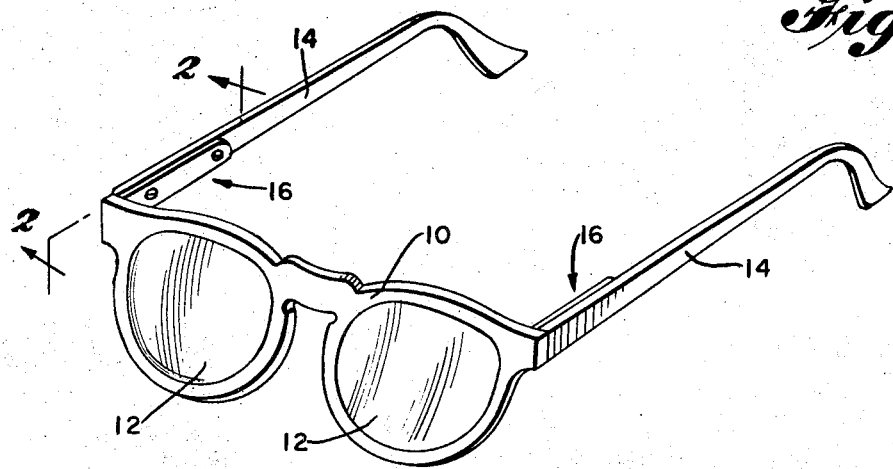
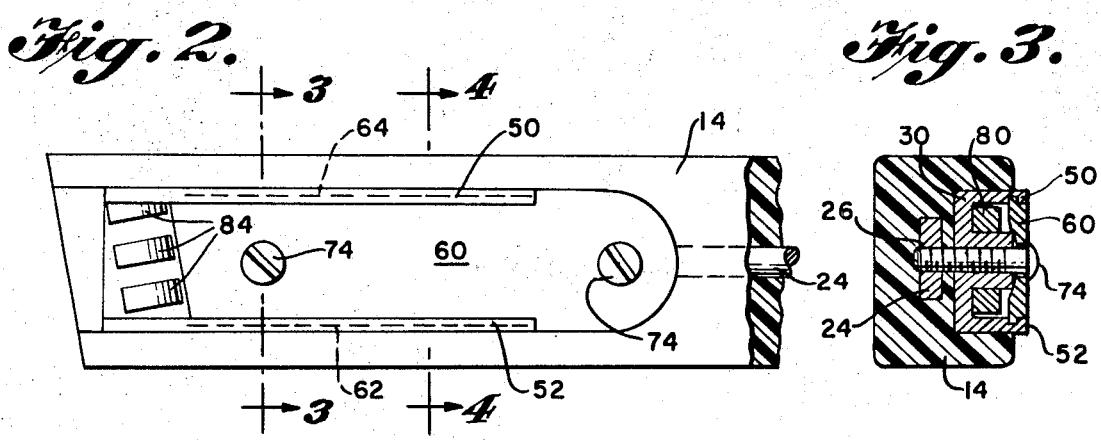
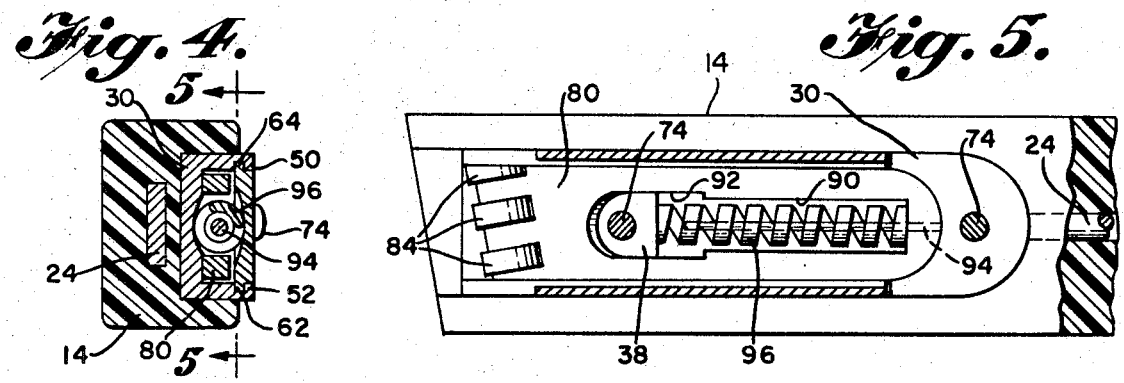
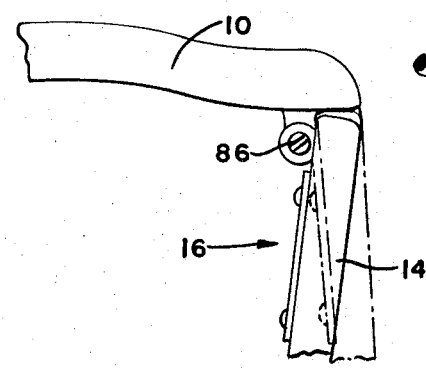
INVENTOR
FREDERICK SPEER
BY Richard L. Cannaday
ATTORNEY March 2, 1971 F. SPEER 3,567,314
CARTRIDGE-TYPE SPRING-LOADED HINGE FOR SPECTACLE FRAMES
Filed June 2, 1969 3 Sheets-Sheet 2

INVENTOR
FREDERICK SPEER

BY *Richard L. Cannaday*
ATTORNEY

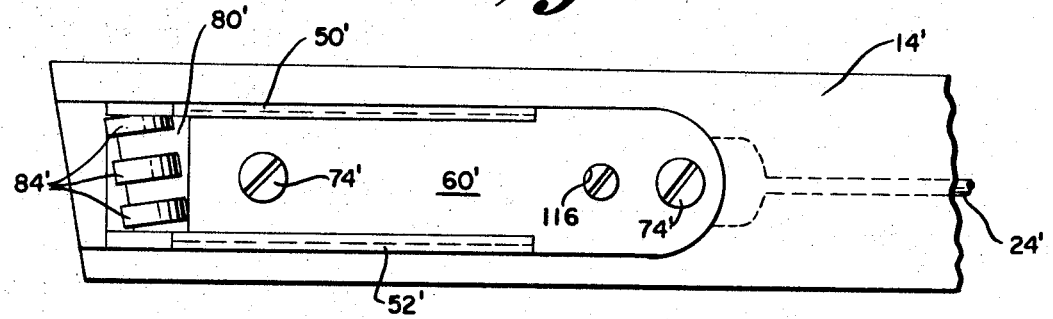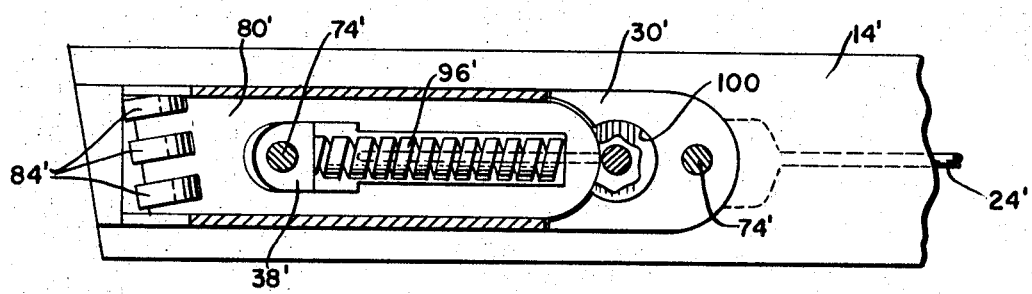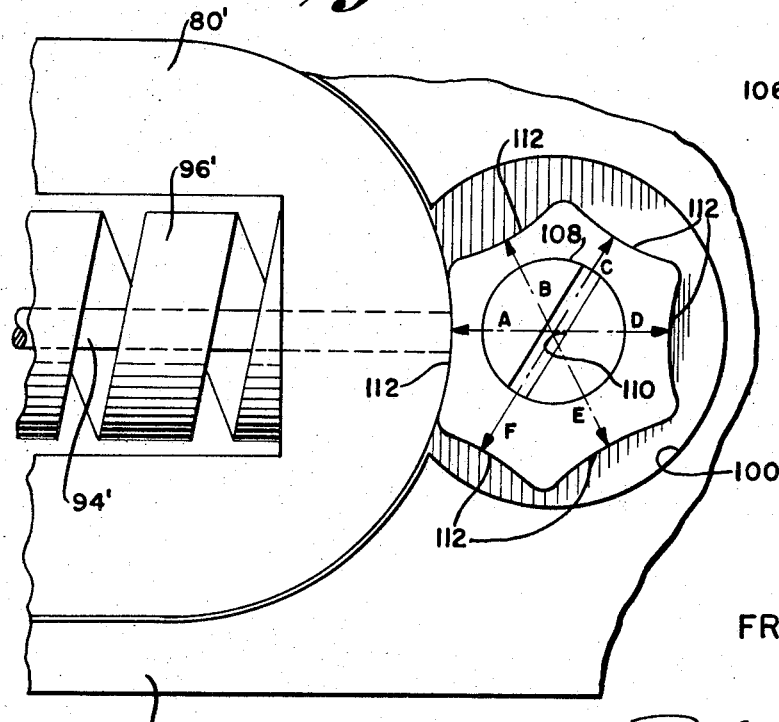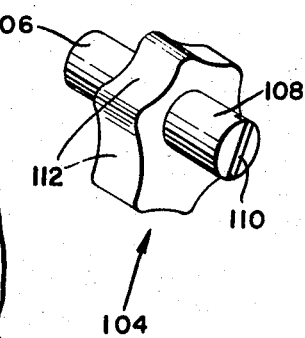

United States Patent Office 3,567,314
Patented Mar. 2, 1971

3,567,314
CARTRIDGE-TYPE SPRING-LOADED HINGE FOR SPECTACLE FRAMES
Frederick Speer, 131 Briar Hill Circle,
Springfield, N.J. 07081
Filed June 2, 1969, Ser. No. 829,657
Int. Cl. G02c 5/16, 5/20
U.S. Cl. 351—113                    3 Claims

ABSTRACT OF THE DISCLOSURE

A temple is interconnected with a lens support frame by a cartridge-type spring-loaded hinge, there being two temples in a complete spectacle frame. Each hinge comprises a cartridge received within a recess in the end of a temple. The cartridge includes a housing formed of a base and a cover plate and is assembled as a unit. Interengageable portions are provided on the base and the cover plate for holding the cover plate in operative position. A hinge plate carries hinge connecting means which is connected with cooperating means on the lens support frame. The hinge plate is slidably supported by the housing of the cartridge, and a spring within the cartridge normally biases the hinge plate in one direction. Means is also provided for selectively prestressing the spring.

BACKGROUND OF THE INVENTION

The present invention relates to a spring-loaded hinge assembly for spectacle frames which normally biases the temples inwardly of the spectacle frame so that the temples positively engage the head of the wearer to retain the spectacle frame in position. This type of spectacle frame is designed to obtain a perfect fit on the sides of a person's head without requiring special adjustments. Additionally, such a resilient biasing arrangement ensures that the lens support or lens holding portion of the spectacle frame will remain properly positioned high on the nose and will not slide down along the nose when a person bends forwardly. It is desirable to provide a construction wherein the hinge is in the form of a cartridge unit which can be installed within a temple, and it is additionally important to provide a construtcion which provides an attractive appearance.

Spring-loaded hinges of this nature in the prior art have been excessively complex in construction and have not held up well under extended use. Furthermore, it is rather difficult to assemble and disassemble such prior art constructions. Additionally, conventional spring-loaded hinges are often difficult to mount and dismount with respect to an associated temple. In many instances, it is also desirable to provide a system or means of adjustment whereby the normal angle of "toe-in" of each temple may be varied, thus permitting the pressure exerted by the temples on the person's head to vary in accordance with the particular situation such as comfort considerations or requirements of positive retention.

SUMMARY OF THE INVENTION

A spectacle manufacturer or repairman is provided by the cartridge of the present invention with a supply of preassembled hinge units, which may be formed from different colored materials, and stored so as to be readily available for assembly with the lens support or holding frame and temple bars or elements to complete a set of spectacles or allow the convenient repair of a broken temple hinge without requiring the purchase of a new set of frames.

In the present invention, the hinge assembly comprises a cartridge unit which may be readily mounted and dismounted with respect to a suitable recess provided in an associated temple. When mounted in operative position, the cartridge unit provides a functionally attractive appearance. This unit includes a housing formed of a base and a cover plate. The base and the cover plate include interengageable portions for retaining the cover plate in operative position thereby providing a very sturdy construction which is adapted to withstand extensive use. A hinge plate is slidably supported by the housing and inside the cover plate, and resilient means also within the cartridge normally biases the hinge plate in one direction with respect to the housing whereby the temple to which the hinge plate is pivotally connected is biased inwardly in the desired manner.

The cartridge-type spring-loaded hinge of the present invention is quite simple and inexpensive in construction, and may be readily assembled and disassembled. It is also a simple matter to mount and dismount this cartridge unit with respect to an associated temple. In a modified form of the invention, the cartridge unit includes adjustment means for selectively prestressing the spring or resilient means which biases the hinge plate for sliding movement with respect to the housing and thus with respect to a temple. This adjustment means enables the spring to be prestressed so that the pressure exerted on a person's head by the temples of a complete spectacle frame assembly may be varied as desired.

The nature and substance of the present invention as well as its objects and advantages will be more clearly preceived and fully understood upon referring to the following description and claims considered in connection with the accompanying drawings which are briefly described below.

BRIEF DESCRIPTION OF THE DRAWINGS

FIG. 1 is a top perspective view of a complete spectacle frame incorporating the hinge of the present invention;

FIG. 2 is a view in an enlarged scale taken substantially along line 2—2 of FIG. 1 looking in the direction of the arrows, and being shown partly in section;

FIG. 3 is a sectional view taken substantially along line 3—3 of FIG. 2 looking in the direction of the arrows;

FIG. 4 is a sectional view taken substantially along line 4—4 of FIG. 2 looking in the direction of the arrows;

FIG. 5 is a setcional view taken substantially along line 5—5 of FIG. 4 looking in the direction of the arrows;

FIG. 6 is a top view of a portion of the spectacle frame shown in FIG. 1;

FIG. 10 is an elevation view of a modified spring-loaded hinge according to the present invention incorporating a mechanism whereby the normal prestressing or precompression of the loading spring may be varied;

FIG. 11 is a view in sectional elevation taken through FIG. 10 with the cover plate of the hinge assembly removed;

FIG. 12 is an enlarged view of a portion of the structure shown in FIG. 11; and

FIG. 13 is a top perspective view of the cam adjustment device of this form of the invention.

DESCRIPTION OF THE PREFERRED EMBODIMENTS

Figure 7:
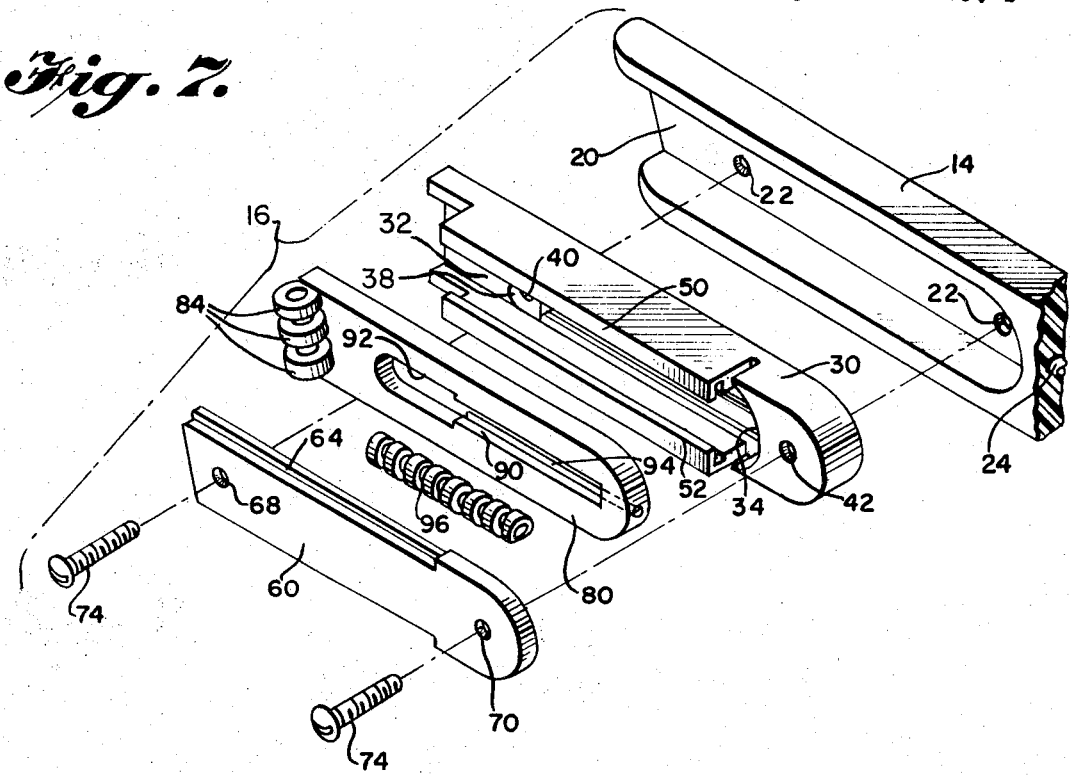
FIG. 7 is a top exploded perspective view of the hinge of the present invention.

Referring now to the drawings in detail wherein like reference numbers designate corresponding parts throughout the several views, FIG. 1 shows a complete spectacle frame which includes the usual lens support frame 10 having a pair of lenses 12 supported therein and thereby. A pair of relatively conventional temples 14 are hingedly connected with opposite ends of the lens support frame by spring-loaded hinges or hinge assemblies of the present invention generally designated 16. Referring to FIG. 6, the attitude or position of the temple illustrated in full line is the position into which the temple is normally turned with respect to the lens support frame by the spring of the hinge assembly in the absence of any resistance, and in this position the temple will exert no pressure against a person's head. The phantom line position shown in FIG. 6 represents about a usual position of the temple when it has been swung outwardly to thereby place the spring of the hinge assembly under some or an increased compression causing a return pressure to be exerted on a person's head to retain the whole spectacle frame in proper position.

As seen most clearly in FIG. 7, the outer or forward portion of each of the temples is provided with a recess 20 on its inner side and opening through the end thereof. A pair of spaced holes 22 are provided in the bottom wall of this recess. As seen most clearly in FIG. 3, a rigid core wire or element 24 is embedded within each temple which may be formed of plastic or any other suitable material, and the core element is characterized by a pair of drilled and tapped holes 26 aligned with the holes 22 in the bottom of the recess in the temple for receiving the hinge assembly attaching screws hereinafter identified.

Figure 8:
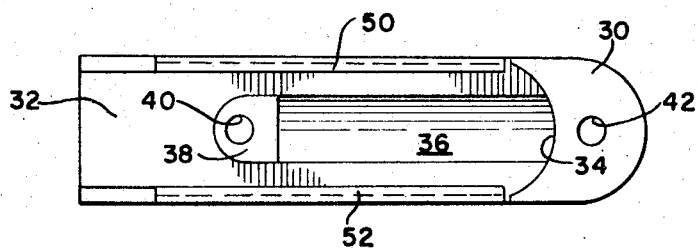
FIG. 8 is an elevation view of the base element of the housing assembly or sub-assembly of the hinge assembly.

The cartridge-type hinge of the present invention includes a housing assembly or sub-assembly which is formed partly by a base element 30. As seen most clearly in FIGS. 7 and 8, this element is characterized by an elongated recess 32 therein which opens through one of its ends. An interior end wall 34 of the base defines the opposite closed end of recess 32, and serves as an abutment surface as hereinafter described. An elongated, somewhat rounded groove 36 is defined in the bottom wall or surface of the recess 32 for receiving a biasing spring described hereinafter. Base element 30 includes an integral projection 38 which extends upwardly from the bottom wall of recess 32. A hole 40 is formed through projection 38 and the entire base element, and a hole 42 is also formed through this element. These holes 40 and 42 are disposed to align with the holes 22 previously mentioned. Additionally, base element 30 comprises integral flanges 50 and 52 which are disposed at opposite sides of the base and extend upwardly or outwardly from it. They are characterized by facing, parallel grooves as shown.

Figure 9:
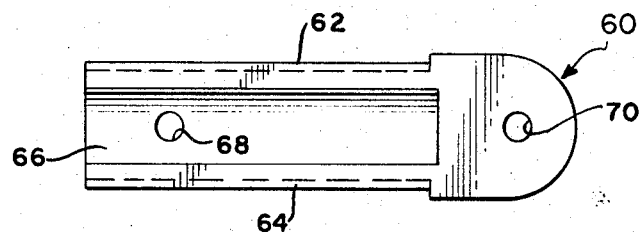
FIG. 9 is an elevation view of the cover plate of the hinge housing seen from the reverse side from its showing in FIG. 7.

The hinge housing also includes a cover plate 60. As seen most clearly in FIGS. 7 and 9 looking from one side and then another, this plate includes flanges 62 and 64 formed at opposite sides thereof. These flanges are shaped and sized to be received in interengaging relationship with flanges 50 and 52 of the base element as seen most clearly, for example, in FIGS. 3 and 4 whereby the cover plate can be slid into its operative position with its flanges running in the base flange grooves. The interengageable flange arrangement of base element 30 and cover plate 60 insures that the cover plate is retained in proper operative position, particularly while a hinge cartridge is in storage or inventory prior to assembly on a temple. After assembly, the screws passing through holes 22, 40 and 42 are sufficient to maintain alignment of the various parts. Cover plate 60 also characterized by an elongated groove 66 formed in the undersurface thereof for accommodating a spring cooperatively with groove 36 in base element 30. Spaced holes 68 and 70 are formed through the cover plate and are disposed to align as appropriate with the holes 40, 42 and 22 previously described. Attaching screws 74 are provided to extend through the aligned holes formed in the cover plate, the base element and the associated temple, and be threaded into tapped holes defined in a widened portion of core member 24 of the temple, and thereby hold the hinge cartridge unit in assembled operative position.

A hinge plate 80 constituting another element of the hinge cartridge assembly has hinge connecting means 84 formed on it at its outer or forward end, this means being interconnected with conventional cooperating hinge connecting means mounted or formed on lens support frame 10. The pivoted joint is formed by or around a screw or pin 86 of conventional construction as shown, for example, in FIG. 6. Referring now particularly to FIGS. 5 and 7, the hinge plate is characterized by an elongated slot 90 formed therethrough, with this slot having relatively enlarged or widened region 92 at its left end. A pin 94 is supported in and by the hinge plate, and extends longitudinally and centrally of slot 90 from the right end thereof. This pin serves as a guide means for a compression spring 96 disposed about the pin and positioned within the slot.

Projection 38 on base element 30 is received within the enlarged region 92 of the slot in the hinge plate. In the operative or assembled condition of the apparatus, spring 96 has its left end bearing against projection 38 and its right end abutting the hinge plate for normally biasing hinge plate 80 to the right with respect to the associated hinge housing sub-assembly to bank against interior surface 34 of the base element thereof. The hinge plate, of course, is slidable with respect to the housing, and extends out through the open end of that sub-assembly for attachment to the related hinge connecting means of the lens support frame. Spring 96 normally acts to exert a torque on temple 14 to swing it inwardly toward its solid line position or attitude in FIG. 6, and thus to firmly engage the head of a wearer of spectacles.

Referring now to FIGS. 10–13, inclusive, a modified form of the invention is illustrated. The construction of this form of the invention is identical in many respects to that previously described, and similar parts have been given the same reference numbers primed. In this embodiment of the invention, an adjustment mechanism is provided which enables the spring of the hinge to be pre-stressed so as to vary the position of repose of the temples to various degrees or angles of toe-in when biased inwardly by the spring means. For a typical example, the toe-in may be an angle of approximately —3° which will apply maximum pressure to a person's head when the temples are normally so set or adjusted. If the temples are adjusted so that their normal position of repose is one in which they are disposed substantially at 90° to the lens support frame, a minimum amount of pressure will be applied to a person's head when the spectacles are in use, assuming the same person, i.e., same cranial dimensions, and same spectacles or spectacle dimensions in each case.

A recess 100 is provided in the base element 30' which receives a one-piece rotatable cam device indicated generally by reference number 104. The cam device includes a stub shaft or hub portion 106 which is journaled within a corresponding bearing recess or aperture (not shown) formed in the bottom of recess 100. A further and opposite hub portion 108 of cam device 104 is provided with a kerf 110 in its outer end so that the actual cam element may be adjusted rotatably by a suitable tool such as a screw driver. As shown most clearly in FIG. 12, the cam element of device 104 is characterized by a plurality of concave peripheral surface segments or portions 112 which are disposed at different minimum distances from the axis of rotation of the device. These distances are indicated by reference characters A, B, C, D, E and F as seen in FIG. 12, and in a typical example may be respectively .035, .038, .041, .044, .047 and .050 inch. The surfaces 112 themselves serve as successively selective banking surfaces for hinge plate 80' which is steadily urged to the right by the force of compression spring 96'.

As seen in FIG. 10, cover plate 60' is provided with a hole 116 wherethrough cam hub portion 108 extends and whereat one can gain access to the kerf 110 therein so that the cam device may be adjusted with the hinge assembly cover plate in place. The cover plate is actually very thin, and so may be flexed or snapped over hub portion 108 as it, the cover plate, is slid into its accommodating grooves in flanges 50' and 52' of base element 30'. It is apparent that by rotating the cam device to different angular positions the amount of prestress of spring 96' of the hinge may be selectively adjusted as the location of the effective banking surface of hinge plate 80' is shifted. The farther that hinge plate 80' is moved to the left (cam surface F being in use, for example) the more prestress or precompression is imposed on spring 96'. With more prestress the normal toe-in angle of temple 14' is reduced, and the spectacles of which it is a component will fit more comfortably yet firmly on a person having a relatively wide head.

As this invention may be embodied in several forms without departing from the spirit or essential characteristics thereof, the present embodiments are therefore illustrative and not restrictive, and since the scope of the invention is defined by the appended claims, all changes that fall within the metes and bounds of the claims or that constitute their functional as well as conjointly cooperative equivalents are therefore intended to be embraced by those claims. In particular, while this invention has been generally illustrated and described in relation to spectacle temples made of plastic material it may be practiced just as well in relation to temples made of metal, for example, temples made of aluminum or an aluminum alloy. Such an arrangement would differ from the ones illustrated mainly just in that there would be no core wire 24 or 24' but rather the attaching screws 74 or 74' would be threaded directly into tapped holes in the base temple material.

What is claimed is:

1. A unitary cartridge-type hinge assembly for spectacle temples comprising (1) a housing open at one end, (2) a hinge plate having one end and another end and disposed within and slidably supported by said housing and including hinge connecting means at its end nearer to said open end of said housing for pivotal joining to cooperating hinge connecting means on a lens support frame, (3) a spring within said housing engaging said hinge plate and normally biasing the same for movement in a direction bringing said hinge plate farther within said housing, and (4) an adjustment means mounted on said housing for selectively prestressing said spring and simultaneously varying the normal position of said hinge plate with respect to said housing by holding said hinge plate in a plurality of positions in opposition to the force of said spring, said adjustment means including a rotatable cam device providing a variable banking surface for an end surface of said hinge plate at its end farther from said open end of said housing.

2. Apparatus as defined in claim 1 including means for selectively rotating said rotatable cam device with respect to said housing and hinge plate.

3. Apparatus as defined in claim 2 wherein said rotatable cam device includes a plurality of concave peripheral portions disposed at varying distances from the axis of rotation of the device.

References Cited

UNITED STATES PATENTS

| 1,459,348 | 6/1923 | Stevens | 351—148 |
| 1,649,787 | 11/1927 | Stevens | 351—117 |
| 1,650,576 | 11/1927 | Welsh | 351—117 |
| 1,908,053 | 5/1933 | Rigler | 351—113X |
| 3,166,754 | 1/1965 | Stegeman | 351—153 |
| 3,243,248 | 3/1966 | Speer | 351—113X |

FOREIGN PATENTS

| 594,803 | 6/1959 | Italy | 351—113 |

DAVID SCHONBERG, Primary Examiner
J. W. LEONARD, Assistant Examiner

U.S. Cl. X.R.
16—180; 351—121